United States Patent
Grandia et al.

[15] 3,674,004
[45] July 4, 1972

[54] PRECISION CUTTING APPARATUS AND METHOD OF OPERATION THEREFOR

[72] Inventors: Johannes Grandia, Putnam Valley; Robert Lewis Rohr, Scarsdale, both of N.Y.

[73] Assignee: International Business Machines Corporation, Armonk, N.Y.

[22] Filed: Dec. 30, 1969

[21] Appl. No.: 889,277

[52] U.S. Cl. ............................................. 125/16 R, 51/59 R
[51] Int. Cl. ................................................................ B28d 5/04
[58] Field of Search .................... 125/12, 16, 17, 35; 30/304; 15/236; 51/59

[56] References Cited

UNITED STATES PATENTS

| | | | |
|---|---|---|---|
| 1,739,214 | 12/1929 | Darling | 30/304 |
| 1,746,737 | 2/1930 | Patch | 125/16 |
| 2,774,194 | 12/1956 | Thatcher | 51/59 |
| 2,556,167 | 6/1951 | Coleman | 125/35 |
| 2,813,377 | 11/1957 | Duran | 51/59 |
| 3,079,908 | 3/1963 | Hunt | 125/17 |
| 3,545,325 | 12/1970 | Camasta | 125/12 X |
| 3,383,768 | 5/1968 | Hamilton | 30/294 X |

FOREIGN PATENTS OR APPLICATIONS

| | | | |
|---|---|---|---|
| 283,458 | 1/1928 | Great Britain | 15/236 |

*Primary Examiner*—Harold D. Whitehead
*Attorney*—Hanifin and Jancin and Thomas J. Kilgannon, Jr.

[57] ABSTRACT

A precision cutting apparatus including a cutting tool which consists of at least a single flexible cutting element and means coacting with said cutting element for holding it in a rigid, unstressed condition is disclosed. The flexible cutting element is ordinary spring steel while the means for holding the cutting element in a rigid, unstressed condition is a block of dimensionally-stable pyrolytic graphite containing a groove in which the spring steel cutting element is receivable. Also disclosed, is translation means for applying rectilinear motion to the cutting tool, and a means for aligning the work piece relative to the cutting tool. The grooved graphite block, in addition to providing a dimensionally stable holder, also provides a porous material into which an adhesive may be introduced to retain the cutting element within the grooves. Heating the graphite block liquefies an appropriate adhesive and permits the removal of an old cutting element and its replacement with a new cutting element. A method of operating the cutting apparatus is also shown including an alignment step which permits extremely precise cutting. The apparatus and method taught have particular utility in the semiconductor area where the ability to dice with great precision, for example, greatly enhances the yield of usable semiconductor chips.

4 Claims, 5 Drawing Figures

PATENTED JUL 4 1972　　3,674,004

INVENTORS
JOHANNES GRANDIA
ROBERT L. ROHR

BY 
ATTORNEY

PATENTED JUL 4 1972　　　　3,674,004

SHEET 2 OF 2

PRECISION CUTTING APPARATUS AND METHOD OF OPERATION THEREFOR

BACKGROUND OF THE INVENTION

1. Field of the Invention

This invention relates generally to apparatus and method for the precision cutting of semiconductor materials and the like. More particularly, it relates to apparatus utilizing unstressed blades in a precision grooved holder which in conjunction with an abrasive slurry may be utilized to provide very narrow cuts in semiconductor wafers and the like which are more damage-free than cuts obtained using prior art-cutting devices. The method utilized in its broadest aspect includes an alignment step which precisely aligns the cutting assembly relative to a work piece prior to a cutting step. More particularly, the alignment step includes a step of aligning a reference on an alignment fixture with a cutting element and then positioning a rotatable and translatable work stage to a desired position relative to the reference. The apparatus shown is simple and inexpensive and provides semiconductor chips, for example, which have less cutting damage than that provided by more expensive prior art cutting apparatus and as a result, the yield of usable semiconductor chips is greater than that obtainable using prior art cutting apparatus.

2. Description of Prior Art

Systems for cutting, sawing, and dicing of materials have been known since time began. The ability to cut and machine different materials can, by itself, be considered an index of the state of civilization of any society. Innumerable examples can be given which would run the gamut from the cutting of enormous stone slabs to present day semiconductor technology where the cutting of semiconductor wafers into dice a few mils square is considered a fairly routine technique. The demands of integrated circuits technology are however requiring that more devices per unit area be placed on a semiconductor die. Up until the present time when "real estate" requirements were not so stringent, the dicing of semiconductor wafers could be carried out by commercially available dicing machines. The basic element of most of these dicing machines consists of a spring steel cutting element which is stretched under very high tension to provide a cutting element which is rigid and straight. A typical cutting element width is 8 mils, with 4 mil cutting elements being used under very special circumstances. Below 4 mil widths, stressed blades cannot be used since the tension required to maintain them rigid and straight more often than not causes the cutting element to snap. Even where stressed blades are normally used, when semiconductor wafers are being diced, the yield is not impressive because of the variable characteristics of the spring steel cutting elements utilized. Thus, the same tension on one cutting element in a blade pack will not necessarily produce the same rigidity and straightness in another cutting element of the same blade pack. As a result, different dice resulting from the cutting of the same semiconductor wafer may all have different edge features and, indeed, some may be so damaged that they are not useful. One way to get around this problem, of course, is to provide sufficient clearance between the active semiconductor area and the edge of the chip. Under such circumstances though, the useful active semiconductor area is substantially reduced and the yield is reduced over that obtained from wafers which incorporate smaller clearance requirements. As the semiconductor dicing art stands, there is no commercially available chip dicing machine which is capable of producing 2 mil cuts in a semiconductor wafer with little or no cutting damage. Also, there is no machine available which can materially add to the yield of semiconductor devices as a result of its meeting the stringent "real estate" requirements now being put forth in the fabrication of semiconductor devices. The cutting apparatus of the present application overcomes all the prior art deficiencies by virtue of the utilization of an unstressed blade which is held in a rigid and unstressed condition by a holder containing dimensionally stable and precision cut grooves.

Part of the problem in achieving precision cutting of semiconductors by prior art machines resides in the fact that once a cut is started, if a cutting element of a stressed blade pack breaks, there is no way of reproducibly aligning the new blade pack to the position where the old blade pack ceased cutting. The breaking of a cutting element in the stressed blade environment leads to a changing of the conditions on the remaining cutting elements and, as a result, when an element snaps, the wafer being diced usually is discarded. The apparatus of the present application does not suffer from blade snapping and, when the blades become unusable, new cutting elements may be replaced and the dicing continued as if nothing had happened. Apart from the ability to provide precision cuts which prior art arrangements cannot accomplish, the ability to replace a complete blade pack or a portion thereof without affecting accuracy alone is sufficient to make the apparatus of the present application extremely attractive to practitioners in the semiconductor cutting art.

SUMMARY OF THE INVENTION

FIELD OF THE INVENTION

This invention relates generally to apparatus for cutting or dicing semiconductor wafers and the like. In its broadest aspect, the cutting apparatus includes a cutting assembly which is mounted in a carriage assembly in a precision manner relative to a workpiece which is to be cut. Alignment of the carriage and cutting assemblies relative to the workpiece is accomplished by an alignment assembly prior to the actual dicing of a semiconductor wafer, for example. Once the alignment has been accomplished, translation means are utilized to apply rectilinear motion to the carriage and cutting assembly. Cutting of a semiconductor wafer is accomplished in a very precise manner by the action of a flexible, unstressed cutting element mounted in a cutter holder and a diamond slurry or other abrasive slurry of selected particle size.

In accordance with more particular aspects of the invention, the cutting assembly consists of a dimensionally stable, porous material such as pyrolytic graphite which has been previously grooved to receive the flexible cutting elements utilized in the present apparatus. The cutting elements and holder are inserted into a recess in a precisely machined guide block which may be of any material which is capable of being precisely machined. The guide block is receivable in a precisely machined hole in a cutter carriage which forms a portion of the above mentioned carriage assembly. The guide block is disposed in slideable slip-fitting relationship within the aperture in the cutter carriage. The cutter carriage, itself, is mounted on slide shafts by means of precisely fitted ball bushings in the cutter carriage. The cutter carriage is slideably mounted on the carriage slide shafts. The carriage slide shafts in turn are mounted on carriage — support blocks which, by means of carriage block alignment posts which are fixed to a base plate, maintain the carriage support blocks in a fixed position relative to the baseplate. The carriage support blocks contain a plurality of precisely boxed holes into which the carriage block alignment posts are slideably receivable. The alignment assembly consists of a translation stage which is moveable in a direction perpendicular to the cutter carriage motion and a rotatable stage mounted on the translation stage platform which, by means of a worm gear arrangement, may be rotated to accurately position the workpiece to any desired angle. When the workpiece has been aligned, translation means consisting of a motor, eccentric drive-wheel and a drive bar are actuated to apply rectilinear motion to the cutter carriage and cutting assembly. In this manner, the cutting elements are translated across the workpiece where coacting with a previously applied slurry of diamond or other abrasive material, the cutting elements cut a plurality of hollow grooves in the workpiece. By rotating the rotating stage 90°, and again translating the cutting assembly, a semiconductor wafer, for example, can be diced into chips having very precise dimensions. The precision cutting is attributable to the cutting action achieved by the novel cutting elements and cutter holder and by virtue of an alignment fixture which can be detachably mounted on the underside of the cutter carriage. The alignment fixture consists of a positionable frame having a hairline or very thin wire stretched across an opening of approximately the same size as the aperture in the cutter carriage. In an alignment step which precedes the cutting step, the carriage assembly and cutter assembly are removed from the carriage block alignment posts and remounted thereon in an inverted manner. The alignment fixture is then positioned relative to one of the cutting elements by means of screws inserted in grooves on the edge of the frame of the alignment fixture. Once this step has been accomplished, the carriage assembly is reinverted to the normal position. The cutting assembly is then removed with the alignment fixture crosshair indicating the position of a cutting element. This crosshair is then aligned by adjusting the translation and rotating stages such that the workpiece is positioned relative to the crosshair in a desired position. In the usual case where dicing of a semiconductor is to be carried out, a horizontal row is positioned under the crosshair. Once this alignment has been made, no other adjustments are necessary and the position of the cutting elements relative to the workpiece remains fixed.

It should be appreciated that the above-described cutting apparatus and method of alignment permit the dicing of semiconductor wafers and the like to a degree heretofore not attainable because stressed cutting blades are no longer utilized. The use of unstressed cutting elements permits thinner blades to be utilized. Also, the thin cutting blades are constrained in such a way that cutting damage is minimized and, as a result, the yield of useable chips is increased.

It is therefore an object of this invention to provide cutting apparatus and a method of aligment which is an improvement over prior art arrangements in that it can provide extremely fine undamaged cuts on material such as semiconductors and sapphire.

Another object is to provide a cutting apparatus in which the blades can be utilized repeatedly, and in which the cutting elements are replaceable, both factors resulting in apparatus which is simple and highly economical.

The foregoing and other objects, features and advantages of the present invention will be apparent from the following more particular description of a preferred embodiment of the invention as illustrated in the accompanying drawings.

DESCRIPTION OF A PREFERRED EMBODIMENT

Figure 1A:
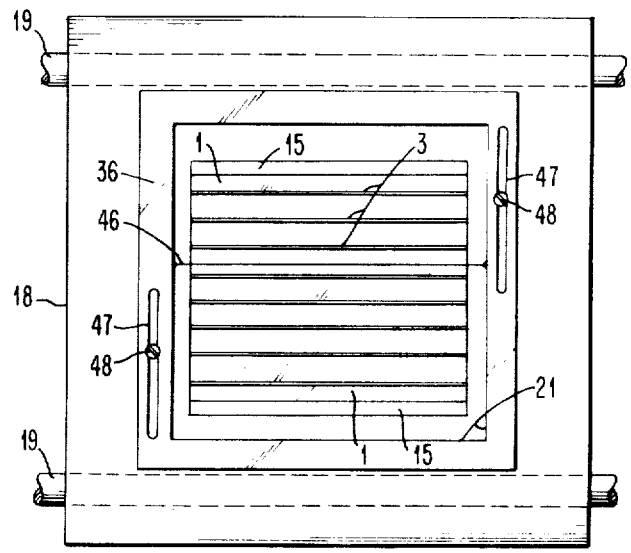
FIG. 1A is a perspective view of the cutting assembly of the cutting apparatus disclosed herein consisting of a precision grooved, dimensionally stable cutter holder having a plurality of unstressed blades disposed in the grooves thereof.

Referring now to FIG. 1A, there is shown a cutter holder 1 containing a plurality of machined grooves 2, each of which has been designed to receive a cutting element 3. Cutter holder 1 is preferably made of pyrolytic graphite which is dimensionally stable and amenable to the formation of precisely cut grooves 2 in its surface. Cutting element 3, are made preferably from shim stock such as spring steel of a width substantially equal to the width of machined grooves 2. Cutting elements 3 may be of any material which does not deteriorate rapidly in an abrasive slurry environment. Cutting elements 3 may have thicknesses of less than 2 mils to thicknesses of 10 to 15 mils. The upper limit of the cutting element thickness is limited only by practical considerations.

As indicated hereinabove, cutter holder 1 is formed preferably of pyrolytic graphite. Pyrolytic graphite is a preferred substance because of its dimensional stability and porosity. Also, it has been found that the material is amenable to precise machining techniques in the formation of grooves 2 in its surface. Using a diamond impregnated rotating saw, grooves 2 can be precisely cut, the saw blade is associated with a positioning arrangement which can be controlled to 0.0003 inch. In this manner, the position of blades 3 which are receivable in grooves 2 is controlled with a high degree of accuracy.

Figure 1B:
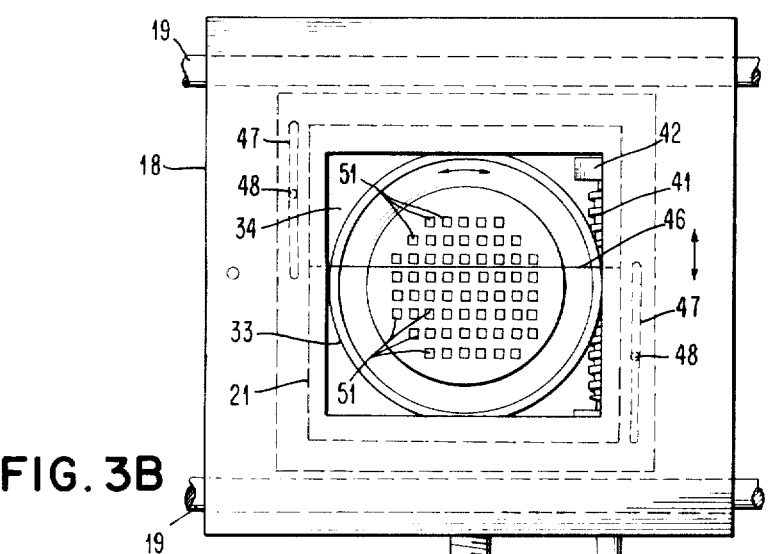
FIG. 1B is an end-view of the cutting assembly of FIG. 1A showing a cutting element having a plurality of slurry pockets in its upper edge.

FIG. 1B shows an end-view of the cutter holder 1 with a blade 3 mounted therein. Blade 3 contains a number of rectangular slurry pockets 4 which are utilized to both distribute an abrasive slurry and to remove waste material from the grooves. In general, the size of the slurry pockets is larger the greater the thickness of cutting elements 3. Slurry pockets 4 are not critical to the operation of the cutting apparatus of the present invention, but their presence enhances the cutting and speeds up the overall cutting process. Cutting elements 3 are disposed in grooves 2 in relatively tight-fitting relationship by virtue of the fact that the thickness of cutting elements 3 and grooves 2 are substantially equal. The precise machining of grooves 2 to extremely fine tolerances removes any residual curvatures or waves in flexible cutting elements 3 which may be present as a result of their manufacturing process. As received, flexible cutting elements 3 which may be formed from commercially available shim stock are never straight and if utilized as cutting elements in a blade pack, they are placed under a very high tensile stress to remove any residual waviness and to maintain the elements straight and rigid. Since the amount of tension which can be applied before the blade snaps is finite, the residual waviness in the prior art blade packs is as a matter of fact never removed and, it is for this reason that edge damage to semiconductor chips cut with stressed blades is rather large relative to the edge damage obtained using the unstressed cutting element of the present invention. It should also be appreciated that the deeper the groove, the smaller is the amount the present cutting elements can wobble as a result of clearance between the blade surface and the edges of the grooves. In a preferred arrangement, the ratio of exposed cutting elements to that retained within the grooves is 1 to 4 or greater.

Because the grooves must be slightly larger than the thickness of the blade to make the insertion of cutting elements 3 relatively easy, some means must be provided to insure retention of cutting elements 3 within grooves 2. This is accomplished in the present application by introducing an organic adhesive such as glycol pthalate into grooves 2. Because of its porous characteristics, graphite absorbs the adhesive in its pores and substantially no room is required within the groove for the adhesive. Once cutting elements 3 are inserted and the glycol pthalate cooled from the temperature at which it liquefied, a mechanical adhesive bond is formed between the sides of cutting elements 3 and the organic adhesive which is present in the pores on the side walls of grooves 2. After cutting elements 3 become worn after substantial usage, cutter holder 1 may be heated and the glycol phthalate adhesive liquefied to permit removal of cutting elements 3. Thereafter, new cutting elements 3 may be inserted; cutter holder 1 cooled and a new blade pack returned to use.

It should be appreciated at this point that once the bladepacks of the stressed type have their tension removed, they cannot be restressed and most be discarded. Therefore, in the prior art if a blade pack having different cutting element thickness and spacing is required, a new bladepack must be introduced into the machine and the old bladepack thrown away. The use of the cutter holder 1 and the unstressed cutting elements 3 obviates the necessity for tensioning the cutting elements and therefore permits the utilization of the same bladepack over and over again until the cutting elements themselves are worn. In the semiconductor cutting environment, this reuse feature represents a considerable saving not to mention the fact that long hours of setting up time during which blade tensioning had to be carried out for the prior art bladepacks is avoided.

Figure 2:
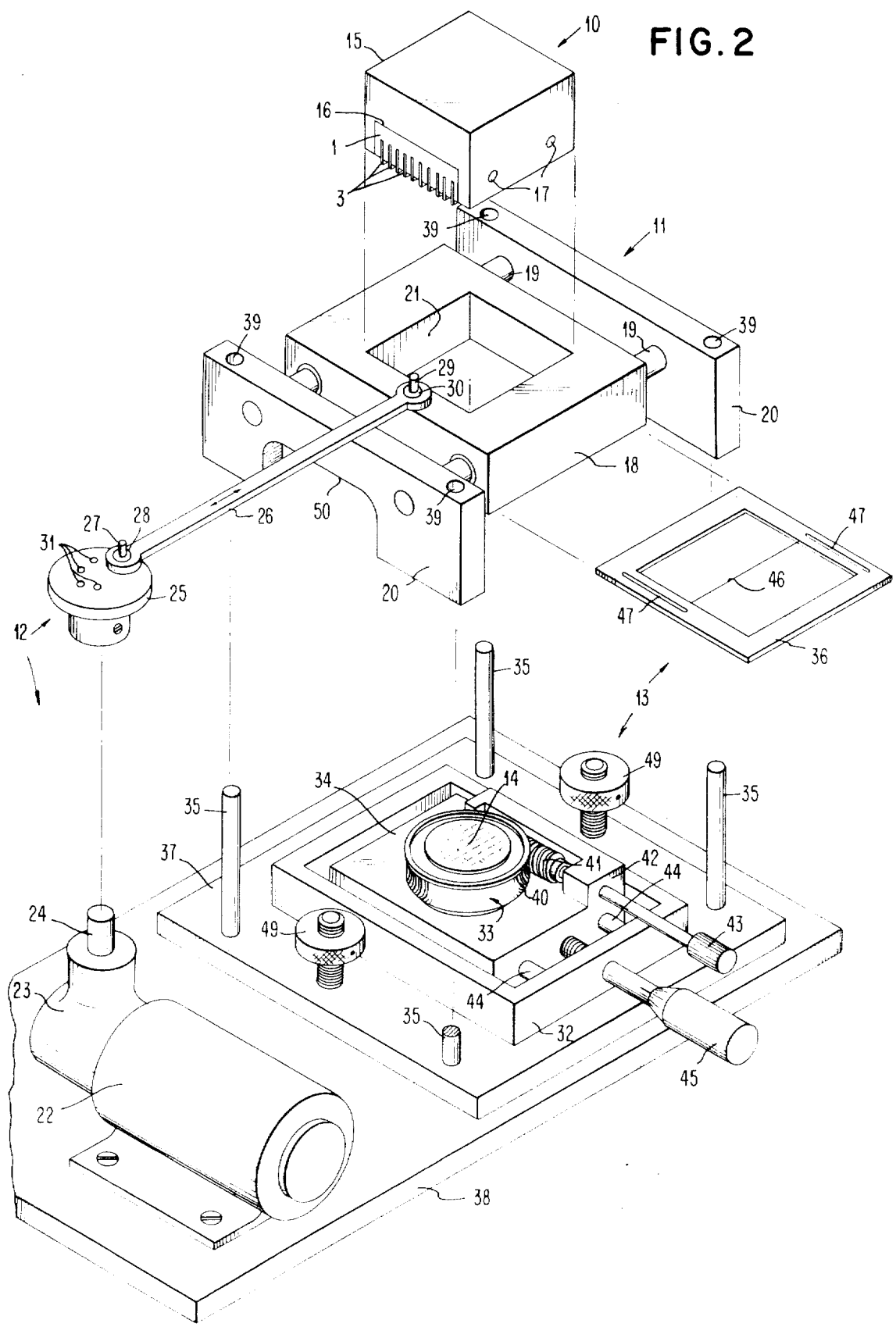
FIG. 2 is an assembly drawing of the cutting apparatus of the present invention showing a cutting assembly, a carriage assembly, an alignment assembly and translation means.

Referring now to FIG. 2, there is shown a perspective view of an assembly drawing of the apparatus of the present invention. The cutting apparatus consists of a cutting assembly 10, a carriage assembly 11, translation means 12, and an alignment assembly 13. These assemblies and means cooperate to form precise parallel grooves in a workpiece 14 which may be a wafer of semiconductor material, sapphire or other material in which precision grooves must be formed. Cutting assembly 10 consists of a guide block 15 having a recess 16 in the underside thereof into which cutter holder 1 is receivable. Guide block 15 and recess 16 are precisely machined to within 0.0003 inch of an inch. Cutter holder 1 is retained within recess 16 by means of pins 17 which pass through mated apertures in guide block 5 and cutter holder 1. Guide block 15 may be made of any material which is amenable to precise machining. The top of guide block 15 may contain a recess for holding weights which may be used to cause cutting elements 3 to bear on the surface of workpiece 14.

Carriage assembly 10 consists of a cutter carriage 18, carriage slide shafts 19 and carriage support blocks 20. Cutter carriage 18 is slideably mounted on carriage slide shafts 19 the extremities of which are fixedly mounted in and supported by carriage support blocks 20. Cutter carriage 18 contains a precisely machined aperture 21 into which guide block 15 is receivable in a slip-fitting relationship. When cutter carriage 18 is properly mounted relative to workpiece 14, it slides to and fro on carriage slide shafts 19 in a rectilinear fashion driven by translation means 12. Translation means 12 includes an adjustable speed DC motor 22 which operates at a speed of 96 rpm. The speed can be reduced to any appropriate ratio speed as dictated by the nature of the work by means of gear box 23 and shaft 24, the latter being connected to an eccentric drive-wheel 25. Eccentric drive-wheel 25 is connected to a drive-bar 26 by a pin 27 which is receivable in a bearing 28 which is disposed in one end of drive-bar 26. A pin 29 fixedly mounted on cutter carriage 18 is receivable in a bearing 30 at the other end of drive-bar 26. The rotation of eccentric drive-wheel 25 causes cutter carriage 18 to move to and fro in a rectilinear manner at a speed which is a function of the revolutions per minute of eccentric drive-wheel 25. Eccentric drive-wheel 25 provides a stroke of adjustable length. This is accomplished by inserting pin 27 into any of the holes 31. Each hole provides a different length of stroke.

Alignment assembly 13 consists of a translation stage 32, a rotating stage 33 disposed on the moveable-platform 34 of translation stage 32, carriage alignment posts 35 and an alignment fixture 36. Alignment posts 35 are precisely mounted near the corners of a platform 37 which is mounted to a baseplate 38. Carriage alignment posts extend upwardly from platform 37 and are receivable in slide fitting relationship in mating precision machined verticle holes 39 which are disposed in carriage support blocks 20.

Workpiece 14 which is affixed to rotating stage 33 can be positioned relative to carriage alignment posts 35 and therefore relative to carriage support blocks 20. Because carriage slide shafts 19 position cutter carriage 18 in fixed relationship relative to support blocks 20, guide block 15 is accurately positioned relative to carriage alignment posts 35. Thus, by adjusting the position of rotating stage 33 and moveable platform 34, workpiece 14 may be initially positioned in accurate relationship relative to cutting elements 3.

With respect to rotating stage 33, gear teeth 40 on the periphery thereof are engaged by a worm gear 41 mounted in a retaining bracket 42 and driven manually by a knob 43. Moveable platform 34 which holds rotating stage 33, is slideably mounted on shafts 44 which are mounted internally of translation stage 32 and driven by a micrometer drive arrangement 45 in a rectilinear manner which is perpendicular to the direction of motion of cutter carriage 18. Adjusting micrometer drive arrangement 45 and knob 43, provides the two degrees of freedom required to properly position cutting elements 3 at desired positions. Since the relationship of all the assemblies are fixed relative to one another, the only unknown is the exact position of a cutting element 3 with respect to a desired position on workpiece 14. To aid in this determination, alignment fixture 36 has a reference crosshair 46 stretched across an opening therein. Slots 47 are engaged by screws which position alignment fixture 36 on the underside of cutter carriage 18.

Figure 3A:
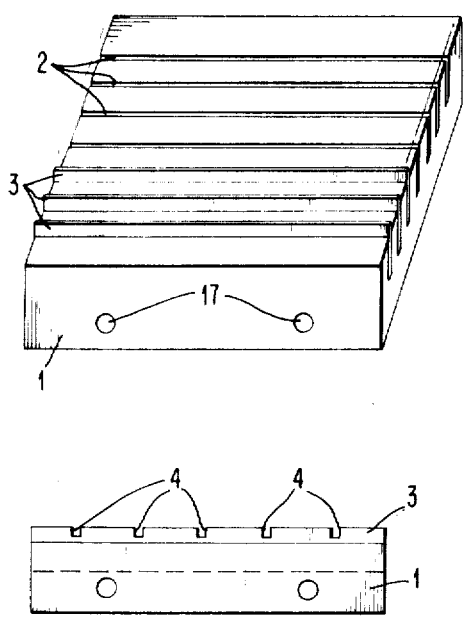
FIG. 3A is a bottom-view of the cutter carriage showing the cutter holder of FIG. 1a disposed in an aperture therein with an alignment fixture adjustably connected to the bottom of the cutter carriage.
Figure 3A:
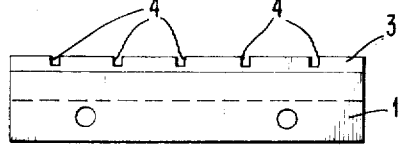

Referring now to FIG. 3A, there is shown a bottom view of cutter carriage 18 which is slideably mounted on carriage slide shafts 19. Alignment fixture 36 is shown fixed to the bottom of cutter carriage 18 by means of screws 48 which engage slots 47 in alignment fixture 36. Guide block 15, cutter holder 1 and cutting elements 3 are visible in aperture 21 in cutter carriage 18. The foregoing picture is what a viewer would see in carrying out an alignment procedure prior to cutting workpiece 14.

The alignment procedure consists in removing carriage assembly 11 from carriage alignment posts 35 and with cutter assembly 10 disposed within aperture 21 of cutter carriage 18, replacing carriage assembly 11 upside down or inverted on carriage alignment posts 35. Once this is done, alignment fixture 36 is adjusted by means of screws 48 and slots 47 so that reference crosshair 46 is positioned precisely over a selected one of cutting elements 3. In FIG. 3A, reference crosshair 46 is not shown positioned over a cutting element 3 so that the relationship of reference crosshair 46 relative to cutting elements 3 can be clearly seen. In actual practice, a microscope arrangement is utilized to accurately position reference crosshair 46 precisely over a cutting element 3.

Figure 3B:
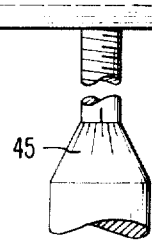
FIG. 3B shows a top-view of the cutter carriage of the present invention with the cutter holder removed to show the juxtaposition of the alignment fixture and its reference crosshair relative to a workpiece.

Once the positioning of reference crosshair 46 relative to a selected cutting element 3 has taken place, carriage assembly 10 is removed from carriage alignment posts 35 and replaced thereon in its normal operating position. Also, cutter assembly 10 is removed from aperture 21 in cutter carriage 18. FIG. 3B shows what an observer would see through aperture 21 in cutter carriage 18 when carriage assembly 11 is replaced on carriage alignment posts 35. Carriage assembly 11 is maintained at a selected height above workpiece 14 by means of a jack screw arrangement 49 shown in FIG. 2. The tops of jack screws 49 engage the tops of recesses 50 in carriage support blocks 20. By adjusting jack screws 49, reference crosshair 46 can be held above workpiece 14 but closely spaced therefrom.

Referring again to FIG. 3B, reference crosshair 46 is not moved from the position set in the adjustment step relating to FIG. 3A and described hereinabove. Rotating stage 3 however may be adjusted so that the horizontal rows between active semiconductor area 51 are in parallel alignment with reference crosshair 46. Also, by adjusting micrometer drive 45, moveable platform 34 on which rotating stage 33 is mounted can be adjusted in a vertical direction to accurately position reference crosshair 46 over one of the horizontal areas between rows of active semiconductor devices 51. When rotation stage 33 and translation stage 32 have been satisfactorily adjusted, alignment fixture 36 is removed and cutting assembly 10 is replaced in aperture 21 of cutter carriage 18. At this point, cutting can begin, and cutting will take place accurately between the rows of active semiconductor devices 51 shown in FIG. 3a. When cutting has been completed, rotating stage 33 need only be rotated 90° and another alignment procedure and cutting step similar to that just described carried out to complete the dicing operation. A slurry of appropriate abrasive material is, of course, introduced onto the surface of workpiece 14 prior to the initiation cutting. The smaller the size of the abrasive materials, the narrower the cut obtained.

At this point is should be appreciated that with the alignment procedure described hereinabove, different cutters having the same spacing between cutting elements 3 but of different thicknesses may be utilized to provide a deeper cut within a previously made cut. The accuracy of the final result is a function of the accuracy of all the elements involved. Thus, each element in the cutting apparatus is machined to tolerances which are as fine as possible. Because the unstressed blades are constrained by accurately machined grooves, it is possible to achieve cuts within semiconductor materials and the like which result in less edge damage than that obtainable using highly stressed cutting elements. Also, the cutting element groove arrangement permits blades of smaller thickness to be utilized than possible when tension must be applied to the cutting elements.

While the cutting apparatus of the present disclosure can be scaled to accommodate different cutting elements, typical cutting element thicknesses range from 2 to 10 mils. In the usual case, workpiece 14 is a 1-inch diameter semiconductor wafer. Using a wafer of this size, the length of cutting elements 3 should be such that at the extremities of the stroke utilized, the ends of cutting element 3 should still overhang the edge of workpiece 14. Where larger diameter workpieces are to be cut, the cutting elements must be made longer and all other assemblies scaled accordingly.

Where close control of accuracy is not a requirement, cutting elements 3 may be interleaved with spacer elements of the same material in recess 16 and wedged in tight fitting relationship to achieve cutting similar to that provided by cutting elements in holder 1. Thickness variations in the cutting elements and spacers are, of course, cumulative and precise control of the spacing between cutting elements cannot be controlled.

In many applications, control of depth of cut is extremely important. The cutting apparatus of the present invention can be controlled to provide cuts which are within a micron of the desired depth. Also, it should be understood that the depth of cut is the same all across the wafer being cut. Such control is not attainable using prior art string saws or stressed blade packs.

While the invention has been particularly shown and described with reference to a preferred embodiment and method steps, it will be understood by those skilled in the art that the foregoing and other changes in form and detail may be made therein without departing from the spirit and scope of the invention.

What is claimed is:

1. Cutting apparatus for grooving a workpiece with high precision comprising means for holding a plurality of flexible cutting elements in a rigid, unstressed condition in parallel spaced relationship,
   means for aligning said holding means in overlying cutting relationship with said workpiece, and
   means for translating said holding means relative to said workpiece to form a plurality of parallel grooves therein,
   said means for translating said holding means includes a moveable carriage constrained to move in a rectilinear manner containing an aperture into which said holding means is slidably receivable, and means for applying rectilinear motion to said moveable carriage and wherein said alignment means includes an alignment fixture disposed in removeable engaging relationship about the underside of said aperture,
   a reference crosshair disposed in fixed relationship with said alignment fixture and,
   means for adjusting said alignment fixture to align said reference crosshair in registry with a cutting element.

2. Cutting apparatus according to claim 1 wherein said alignment means further includes a translation stage and a rotating stage, the latter being disposed in rotating relationship atop the former and, means coupled to each of said stages for applying translatory motion and rotary motion to said translation stage and said rotating stage, respectively, to align a reference on said workpiece with said reference crosshair.

3. In a method for cutting precision grooves in a workpiece with a plurality of rigid, unstressed cutting elements disposed in spaced, parallel relationship in a holder the step of:
   inverting said holder such that said cutting elements face up and opposite said workpiece,
   aligning a reference crosshair means over the edge of one of said cutting elements the position of which is fixed and parallel to the cutting direction,
   removing said holder while maintaining said crosshair in its position,
   adjusting said workpiece to align said reference crosshair means with a reference on said workpiece,
   removing said crosshair means, and
   placing said holder in cutting relationship with said workpiece, said one of said cutting elements being accurately aligned with said reference on said workpiece.

4. In a method according to claim 3 wherein the step of adjusting said workpiece includes the step of applying both a rotary component of motion to said workpiece and a rectilinear component of motion thereto the latter motion being in a direction perpendicular to the cutting direction.

* * * * *